March 1, 1966
R. E. NORVELLE
3,237,494
TAPE CUTOFF WITH TAB FORMING MEANS
Filed July 9, 1963
2 Sheets-Sheet 1
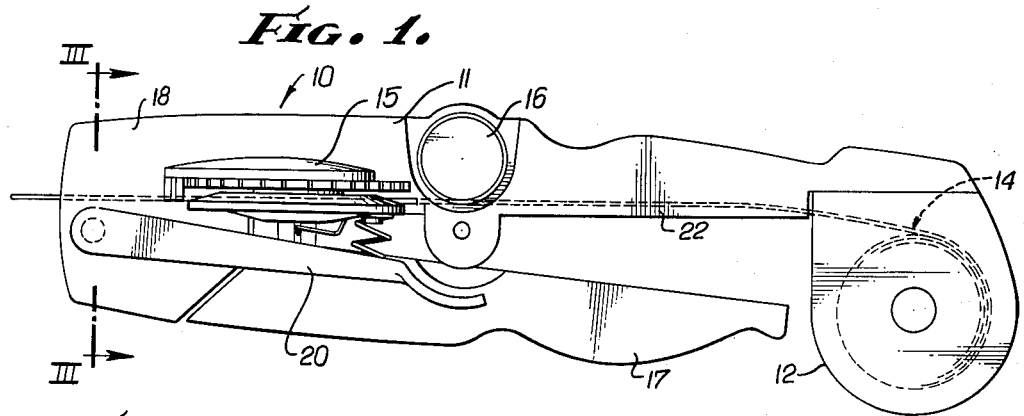
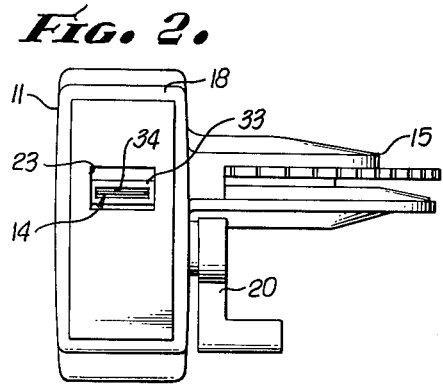
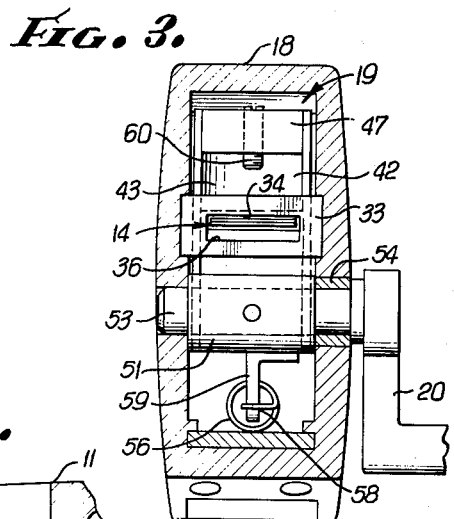
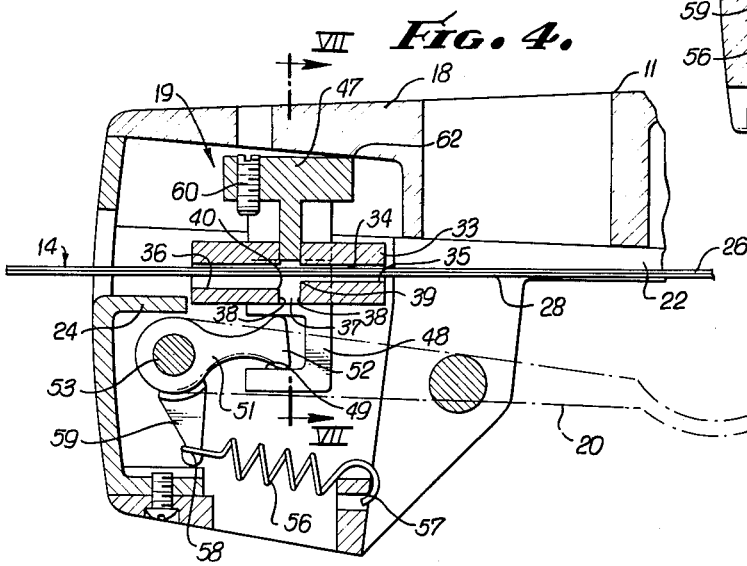
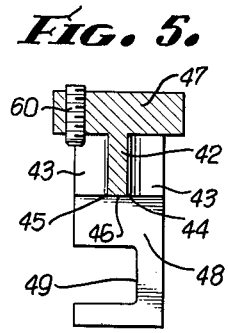
INVENTOR.
RALPH E. NORVELLE
BY Miketta & Glenny
ATTORNEYS.

March 1, 1966  R. E. NORVELLE  3,237,494
TAPE CUTOFF WITH TAB FORMING MEANS
Filed July 9, 1963  2 Sheets-Sheet 2
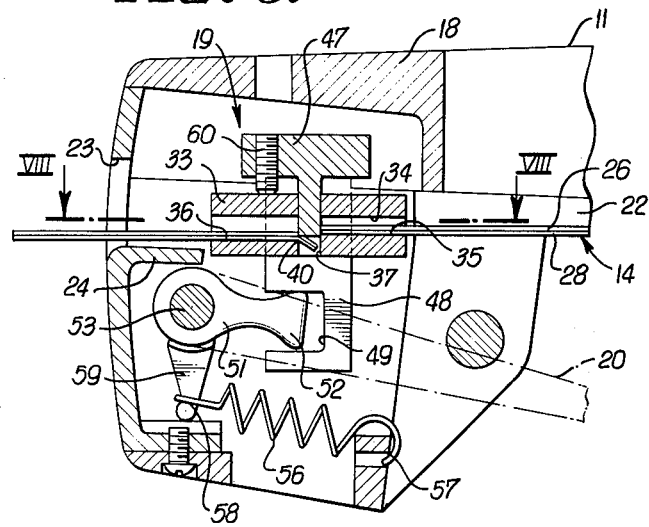
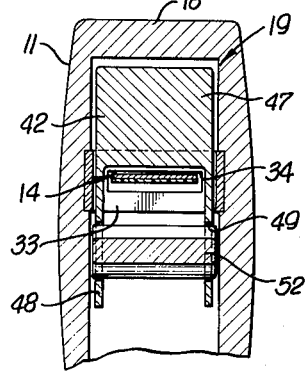
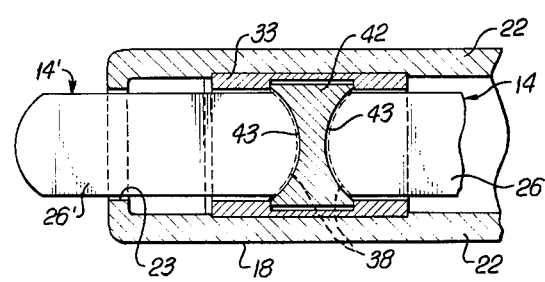
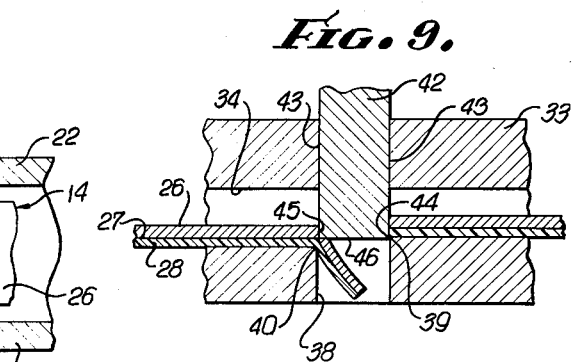
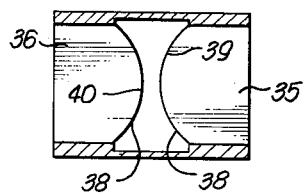
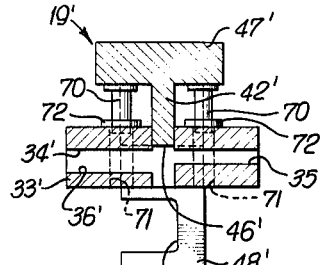
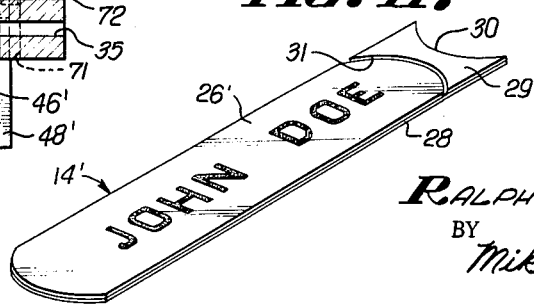
INVENTOR.
RALPH E. NORVELLE
BY Miketta & Glenny
ATTORNEYS.

ns patent office
3,237,494
Patented Mar. 1, 1966

3,237,494
TAPE CUTOFF WITH TAB FORMING MEANS
Ralph E. Norvelle, East Brunswick, N.J., assignor to Dashew Business Machines, Inc., Los Angeles, Calif., a corporation of Delaware
Filed July 9, 1963, Ser. No. 293,821
2 Claims. (Cl. 83—9)

This invention relates generally to devices or tools used with tape or striplike materials, and more particularly to a novel means on a tape embossing tool for cutting said tape and simultaneously providing, on the cutoff portion of the tape, an end tab readily seized or gripped between the thumb and finger of one's hand.

Tape for use in an embossing tool may often be of multiply or laminated construction and may include an embossable strip, ply, or lamina made of thin metal foil, selected plastic materials, or other tape or striplike materials, an adhesive coating on one face of the embossable strip, and a thin backing strip, ply, or lamina made from paper, plastic, fabric, or fibrous materials relatively flexible and stretchable as compared to the embossable strip. The embossable strip will be referred to as the plastic strip for convenience in describing examples of the invention. The backing strip protects the adhesive coating until it is desired to use the tape and permits coiling of the tape without sticking together of adjacent turns of the coil. Prior proposed tape cutoff devices have merely cut through or completely sheared the tape material including the plastic strip, adhesive and backing strip. At such a cut it is difficult to separate the plastic strip and backing strip or to obtain a hold on the backing strip alone in order to commence to strip or pull the backing strip from the adhesive and the plastic strip. Usually a fingernail, knife blade or some other thin sharp instrument must be used in order to initially separate the backing strip from the adhesive on the plastic strip.

The present invention contemplates a novel construction and arrangement of a tape cutoff means which provides a plastic end tab connected to backing strip and severed from the cutoff portion of the plastic strip so that the backing strip may be conveniently, readily and rapidly removed from the plastic strip. Upon removal of the backing strip from the adhesive coating the cutoff portion of the tape may be readily attached to a desired article or object by means of the adhesive coating.

The main object of the present invention, therefore, is to design and provide a novel tape cutoff means adapted to provide an end tab for stripping a removable backing strip from an adhesive coated embossable metal, plastic or other suitable tape strip material.

An object of the invention is to design and provide a tape cutoff means which is readily operable to virtually simultaneously cut through and in spaced relation thereto also score or partially cut through an embossable multiply tape.

A further object of the present invention is to design and provide a tape cutoff means wherein a novel die means severs a selected length of tape from a supply coil of tape while at the same time a backing strip releasably adhered to a plastic strip remains unsevered at a location adjacent the severed edge and carries a severed end tab of the plastic strip.

A further object of the present invention is to design and provide an inexpensive, simply constructed and operable tape cutoff means adapted to accomplish the purposes above stated.

Various other objects and advantages of the present invention will be readily apparent from the following description of the drawings in which an exemplary embodiment of the present invention is shown.

In the drawings:
FIG. 1 is a side elevational view of an embossing tool embodying this invention.
FIG. 2 is a front or end view taken from the left of FIG. 1.
FIG. 3 is a transverse vertical sectional view taken in the plane indicated by line III—III of FIG. 1.
FIG. 4 is an enlarged fragmentary vertical sectional view of the front end of FIG. 1, the section being taken in a plane bisecting the tool.
FIG. 5 is an enlarged fragmentary sectional view of the punch die member.
FIG. 6 is an enlarged fragmentary sectional view taken in the same plane as FIG. 4 and showing cutting of a tape.
FIG. 7 is an enlarged fragmentary transverse view taken in the plane indicated by line VII—VII of FIG. 4.
FIG. 8 is a fragmentary sectional view taken in the horizontal plane indicated by line VIII—VIII of FIG. 6.
FIG. 9 is an enlarged fragmentary view showing forming of the tab.
FIG. 10 is a plan view of the tab forming die surfaces.
FIG. 11 is a perspective view of a tape label formed with a tab.
FIG. 12 is a fragmentary sectional view illustrating a modification of the punch and die means to provide punch holes in tape ends.

In the drawings an exemplary embossing tool 10 for tape is adapted to be equipped with this invention and may comprise an elongated housing 11 of suitable configuration having at its rear end a tape magazine 12 adapted to carry a supply coil of tape 14. Housing 11 also carries adjacent its front end embossing die means 15 and rearwardly of die means 15, a drive means 16. Drive means 16 may be actuated for advancing tape 14 step by step by a pivotally mounted handle member 17 carried below housing 11. Front housing portion 18 is adapted to enclose tape cutoff means 19 of the present invention and to also carry a tape cutoff actuating handle 20. The housing 11, handle 17, drive means 16, embossing die means 15 and tape supply magazine 12 may be of well known construction and may include the structure shown in Letters Patent 2,275,670.

Housing 11 defines a pathway for tape 14 and may include suitable guide means such as side walls 22 limiting lateral displacement of tape 14 and generally providing a straight, through tape pathway from magazine 12 to a front tape outlet or aperture 23. Drive means 16, embossing die means 15, tape cutoff means 19 and a front apron 24 internally of outlet 23 serve to support tape 14 as it is advanced from magazine 12. The pathway through tape cutoff means 19 will be described in detail later.

In this example tape 14 may include an embossable plastic strip 26 of selected width and of a plastic material such as polyvinyl chloride adapted to provide in embossed characters a color contrast with respect to the non-embossed portion of tape strip 26. On the back face of tape strip 26 may be provided a suitable adhesive coating 27 adapted to tenaciously adhere to a surface on which tape 14 or portions thereof are to be attached. On adhesive coating 27 a backing strip 28 of suitable thin material may be removably secured. In this instance backing strip 23 includes a relatively high tensile strength plastic-like stretchable material having considerably more pliancy and stretchability than the plastic strip 26 for a purpose hereafter described.

The means 19 for severing or cutting off a selected length of tape 14 after an embossing operation provides a prescored end tab 29 from strip 26 and of hourglass or concave-concave configuration. Tab 29 includes a concave end edge 30 at a through cut which severs strip 26 and 28 to provide tape portion 14' cutoff from the tape supply. Opposite end edge 30, tab 29 includes a concave cut or deep score 31 in which plastic strip 26 may be completely severed while the backing strip 28 is not severed. In this sense the multiply tape 14 is scored or partially cut so that tab 29 may be readily separated from cutoff tape portion 14'. Thus grasping of tab 29 between one's thumb and finger provides quick, easy stripping of backing strip 28 from adhesive coating 27 and separation of the backing strip from the coating and plastic strip is complete and readily accomplished.

An exemplary tape cutoff means 19 for providing an end tab such as 29 may comprise punch and die means including a die block 33 carried in housing portion 18 rearwardly of apron 24 and provided with a tape passageway 34 in alignment with the pathway for tape 14 through the housing 11. Die block 33 includes die surfaces 35 and 36, die surface 36 being disposed in a plane spaced below the plane of surface 35. The die block includes a transverse vertical opening 37 between surfaces 35 and 36 at the central portion of the die block and of selected shape or configuration. In this example opening 37 is defined by opposed convex die walls 38 to form the concave-concave shape of tab 29. At opening 37 surfaces 35 and 36 terminate in die edges 39 and 40, edge 39 being sharp and acute and edge 40 being relatively somewhat dulled or rounded.

The tape cutoff means 19 also includes a punch, shear, or cutting member 42 having concave walls 43 corresponding to the configuration of walls 38 of opening 37 in the die block 33. The concave walls 43 terminate in shear edges 44 and 45 for cooperation respectively with die edges 39 and 40 to provide end tab 29.

Cutting member 42 may include a flat downwardly facing end face 46 and at its opposite end includes a rectangular head portion 47 from which side guide members 48 depend in the form of side extensions projecting beyond face 46 and along end die block surfaces defining opening 37. Beyond die block 33, guide members 48 may be provided with aligned corresponding rectangular recesses 49 opening forwardly in front edges of the guide members 48.

Means for actuating cutting member 42 to position the same above passageway 35 in inoperative position and then to move cutting member 42 downwardly across tape passageway 34 and into the corresponding opening below the passageway 34 may include cam arms 51 having ends 52 received within recesses 49 for engagement with guide members 48. Arms 51 may be connected to a transverse shaft 53 rotatably mounted in side walls of housing portion 18. One end of shaft 53 may be mounted in a sleeve bearing 54 and projects outwardly to afford a connection to actuating lever 20 which normally extends along housing 11 beneath embossing die means 15.

A spring 56 biases member 51 to cause the cutting member 42 to be normally positioned in upper inoperative position, spring 56 having one end connected at 57 to housing portion 18 and having its other end connected at 58 to a lower end of spring arm 59 fixed to shaft 53.

Stop means for limiting downward movement of cutting member 42 in a tape cutoff operation may comprise a stop set screw or pin 60 carried by and depending from head portion 47 and adapted to abut the top face of die block 33. Pin 60 is readily adjusted to selected depending length and then fixed in such position.

In operation of the tape cutoff means 19 it will be understood that a selected length or portion of tape 14 has passed embossing die means 15 by actuation or operation of the drive means 16 in usual manner. The tape portion 14' to be cut off extends outwardly of outlet 23. When tape cutoff lever 20 is moved downwardly, shaft 53 is turned in a clockwise direction as viewed from FIG. 6 and cam arms 51 in recesses 49 force guide members 48 and the cutting member 42 downwardly in opening 37. As cutting member 42 with its shear edges 44 and 45 contact the top surface of tape 14 in passageway 34, the shear edge 44 cooperates with die edge 39 to completely sever and cut off tape portion 14' from the tape supply in the tape pathway rearwardly of die block 33. Shear edge 44 and die edge 39 are closely fitted so that a clean sharp cut is provided through both plastic strip 26 and backing strip 28.

When tape portion 14' has thus been cut off, the end of tape portion 14' above die surface 36 moves slightly downwardly to rest upon surface 36. As shear edge 45 approaches die edge 40, the material of the plastic strip 26 is sufficiently rigid or stiff that shear edge 45 will very deeply score or sever only the plastic strip 26. When bottom face 46 of cutting member 42 passes below the plane of surface 36 and the plastic strip 26 has been thus scored or cut, the rounded or dull die edge 40 together with the stretchable characteristic of backing strip 28 causes backing strip 28 to be stretched over dulled edge 40 instead of being cut or sheared. Thus a tab 29 consisting of the relatively rigid plastic material is completely severed from tape cutoff portion 14' while at the same time backing strip 28 interconnects the plastic tab 29 and tape cutoff portion 14'. Downward movement of the cutting member 42 is precisely limited and restricted by stop pin 60 so that only a minimum amount of stretching of backing strip 28 occurs. After the stop pin 60 has abutted the top surface of die block 33 lever 20 may be released and coil spring 56 causes the handle to return to its normal position and the punch and cutting member 42 to move upwardly through opening 37 to its normal upper inoperative position. Upward movement of the cutting member 42 may be readily limited by abutment of head portion 47 with the bottom surface of the top wall of housing portion 18 as indicated at 62.

When the tape cutoff portion 14' is removed from embossing tool 10, plastic end tab 29 may be readily grasped between the thumb and finger of a hand and the backing strip 28 rapidly and easily pulled off adhesive coating 27 for the entire length of the cutoff tape portion 14'. When the backing strip is removed, the portion 14' with the adhesive coating thereon may be readily affixed to a desired surface on an object.

In the modification of the tape cutoff means shown in FIG. 2, means for producing punched holes or openings in adjacent ends of the tape are provided. The tape cutoff means 19' is similar in construction to tape cutoff means 19 described above, and includes a die block 33' having a tape passageway 34', die surfaces 35' and 36', an opening 37' and cutting member 42' having a head 47', side guide members 48' and a downwardly directed face 46'. The cutting member 42' is operated in the same manner as cutting member 42 of the previous embodiment of the invention.

In this modification cutting head 47' is provided with depending cylindrical punch members 70, each spaced from the adjacent concave wall 43 of cutting member 42. Die block 33' is provided with aligned die bores 71 for receiving bottom ends of punch members 70. Thus when cutting member 42' is moved downwardly, the bottom faces of punch members 70 will punch circular holes in tape 14 in spaced relation to the end tab formed by the cutting member 42' and the die block 33'. Such holes in ends of cutoff portions of tape 14 may be employed for affixing the cutoff tape portion 14' to an article.

In this modification means for stopping or precisely limiting downward movement of cutting member 42' may comprise spacing disks 72 encircling each punch member 70 and of preselected thickness and seated on the top face of the die block 33'. Thus downward movement of cutting member 42' is stopped with the bottom surface of head 47' abutting spacing disks 72 seated on the top face of the die block.

It will be understood that if desired only one punch member 70 may be employed so that a tape label may have only one punched hole at one end thereof. It will also be understood that if an end tab 29 is not desired or required, the die faces 35' and 36' may be formed on the same plane and a tape portion similar in shape to end tab 29 will be completely severed and cut from tape 14. Such an arrangement may be desirable where a backing strip is not required. The hourglass configuration of the end tab 29 is exemplary only, and any selected configuration may be used without departing from the invention.

Those skilled in the art will understand that various modifications and changes may be made in the tape cutoff means described above, and which may come within the spirit of the invention and all such changes or modifications coming within the scope of the appended claims are embraced thereby.

I claim:

1. Means for virtually simultaneously severing and scoring a composite tape during motion of a cutting member in one direction, comprising: means providing fixed edges spaced in the direction of movement of a tape and defining an opening, said edges being also spaced in the direction of movement of a cutting member; a cutting member movable toward said spaced edges and into said opening, said cutting member having a pair of cutting edges lying in the same plane, one of said cutting edges being cooperable with one of said spaced edges and the other of said cutting edges being cooperable with the other of said spaced edges; one of said spaced edges being sharp and the other of said spaced edges being relatively dull with respect to said sharp edge whereby said dull edge is inoperative to cut tape material placed thereagainst.

2. A tape cutoff and tab forming means for multi-ply tape including a main ply and a backing ply; the combination of: a first means providing a pathway for longitudinal movement of said multi-ply tape; a second means including a cutting member having spaced cutting edges normally spaced from one said of said tape; a third means including a cooperable member having means substantially opposite to said cutting edges and normally positioned at the other side of said tape; and means to actuate one of said means for effecting cutting of said tape, said actuating means including a pivoted member, guide means for the aforesaid one of said means, and means connecting said guide means and said pivot member; said second means on one side of said tape including a head portion, and an adjustable member carried by said head portion for engagement with said third means for limiting movement of said second means in the direction of cutting and severing said tape.

References Cited by the Examiner

UNITED STATES PATENTS

| | | | |
|---|---|---|---|
| 2,415,526 | 2/1947 | Payne | 30—359 X |
| 2,552,353 | 5/1951 | Troth et al. | 83—170 X |
| 2,818,924 | 1/1958 | Lang | 83—39 X |
| 3,091,318 | 5/1963 | Carboni | 197—6.7 |
| 3,091,319 | 5/1963 | Sanders et al. | 197—6.7 |
| 3,133,495 | 5/1964 | De Man | 101—32 |

WILLIAM W. DYER, JR., *Primary Examiner.*

LEON PEAR, ANDREW R. JUHASZ, *Examiners.*